Patented July 13, 1937

2,087,213

UNITED STATES PATENT OFFICE 2,087,213

ACYL DERIVATIVES OF PHENOLS AND A METHOD OF PRODUCING THE SAME

Siegfried Skraup, Wurzburg, Germany, assignor to Schering-Kahlbaum A. G., Berlin, Germany, a corporation of Germany No Drawing. Application July 15, 1936, Serial No. 90,723. In Germany June 13, 1933

7 Claims. (Cl. 260—131)

This invention relates to derivatives of phenols and more particularly to O- and C-acyl derivatives of phenols and a method of producing the same.

As is known, phenols in contrast to the alcohols cannot in general be condensed with free carboxylic acids, but for carrying out this condensation instead of the latter their derivatives, such, for example, as acid chlorides and anhydrides, must be used.

It has now been found that in the presence of heteropoly acids and even in far less than stoichiometrical quantitative proportions, free carboxylic acids may very easily be condensed with phenols, water being split off and acylation taking place in accordance with the following reaction scheme:—

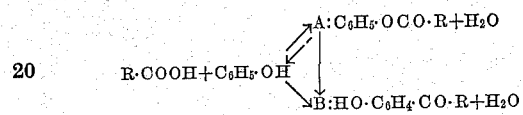

According to the constitution of the components, the heteropoly acids selected, and the experimental conditions, acylation takes place in varying proportions in the hydroxyl groups— thus with the formation of an ester (reaction A)—and in the nucleus—with the formation of a hydroxy-ketone and possibly other products derived therefrom (reaction B).

Since in the presence of the heteropoly acid the reaction A is reversible as shown above, but the reaction B is practically not so, it is rendered possible to start instead of from phenol and carboxylic acid from a prepared ester and to convert this into the hydroxy-ketone.

An advantage of the new invention with respect to other proposed processes lies in the fact that the hydroxy-ketone can be made the main product of the reaction, and the technically valuable o-hydroxy-ketone predominates in the mixtures formed by the reaction.

Thus, in accordance with one feature of the invention, phenols are condensed with carboxylic acids or alcohols in the presence of a heteropoly acid.

According to a further feature of the invention, to prepare nuclear acyl derivatives of phenols, the O-acyl derivatives are transformed in the presence of a heteropoly acid.

The use of the heteropoly acids instead of the means previously employed in such cases is to be valued as a technical advance not only over the employment of the water-sensitive strong condensation agents necessary at least in equivalent quantities and mostly in excess, like sulphuric acid, aluminum chloride etc., since the present process renders it possible to work in the presence of water with small (catalytic) quantities of the heteropoly acids which are again precipitated unchanged. It is also of advantage over the occasional use of surface catalysts since it renders it possible to work in a homogeneous system which yields many advantages, as, for example, besides the strict reproduceability of the results of individual preparations, also the attainment of a favorable ratio of isomers in the resulting mixtures.

This invention is illustrated by the following examples without, however, limiting the same to them:

Example 1

1 part of silicomolybdic acid is maintained gently boiling for 3 hours with 4 parts of benzoic acid and 16 parts of phenol. Then the greatest part of the excess phenol is distilled off. The residue yields by recrystallization from methanol 5 parts of pure phenyl benzoate of M. P. 69° C.

Example 2

1 part of benzoic acid is heated in 4 to 5 parts of phenol with the addition of 5% of phosphotungstic acid for a few hours under a reflux, the mass is diluted with ether after cooling and a layer of water is added. While from the water, possibly after the addition of some bicarbonate solution, the complex acid can be quantitatively recovered, the ether, after treatment with aqueous alkalies, yields about 23% of pure phenyl benzoate (M. P. 68° C.) From the acidified lyes excess phenol and 31% (of the theoretical) of o-hydroxy-benzophenone (M. P. 40° C.) are driven off with steam, which are easily separated by fractional distillation. In the residue from the steam distillation remain about 6% of p-hydroxy-benzophenone of M. P. 135° C. which by recrystallization from hot water is separated from the almost insoluble benzaurine

of which about 11% (of the theoretical) is formed.

Example 3

A solution of 10 parts of 1-naphthyl acetate and 0.5 part of phosphotungstic acid in 25 parts of glacial acetic acid is boiled under the reflux till the starting material is completely transformed. By dilution with water the naphthol ketones formed are precipitated which may be separated according to the instructions of O. N. Witt and Braun in Berichte der Deutschen Chemischen Gesellschaft 47, (1914), page 3216 etc., into 2-aceto-1-naphthol of M. P. 130° C. and 4-aceto-1-naphthol of M. P. 198° C. which are formed in approximately equal quantities. By concentration of the acetic acid filtrate the catalyst can be recovered for further use.

By the term heteropolyacids as used in the specification and the claims annexed hereto I understand compounds as they are known to chemists, the complex anion of which consists of a number of oxygen containing anionogenous radicals and molecules of which at least one differs in its composition from the others. Such heteropolyacids are besides those mentioned in the examples, for instance, boron tungstic acid, cerium molybdic acid, titanium molybdic acid, cobaltium molybdic acid, vanadium phospho-tungstic acid, tellurium tungstic acid, and the like.

Of course, many changes and variations in the reaction conditions, the temperatures employed, the solvents used, the purification methods etc. may be made use of by those skilled in the art in accordance with the principles set forth herein and in the claims annexed hereto.

What I claim is:

1. A method for the production of acyl substitution products of phenols, comprising condensing a carboxylic acid with a phenol in the presence of a heteropolyacid.

2. A method according to claim 1, wherein as heteropolyacid there is used a compound selected from the group of compounds consisting of silico molybdic acid, silico tungstic acid, phospho-molybdic acid and phospho-tungstic acid.

3. A method according to claim 2, wherein as heteropolyacid there is used a compound selected from the group of compounds consisting of silico molybdic acid, silico tungstic acid, phospho-molybdic acid and phospho-tungstic acid.

4. A method according to claim 1, wherein 1-10% of heteropolyacid calculated on the amount of the reaction components are used as condensing agent.

5. A method for the production of a nuclear substitution product of phenols, comprising converting oxygen acyl substitution products of phenols into nuclear substitution products by contacting the former in the presence of a heteropolyacid at a sufficiently high temperature to cause a reaction to take place between said compounds.

6. A method for the production of acyl substituted phenols, comprising heating a carboxylic acid with an excess of a phenol in the presence of a heteropolyacid.

7. A method for the production of nuclear substitution products of phenols, comprising heating an O-acylated phenol in the presence of a heteropolyacid and separating the rearranged nuclear substitution products from the reaction mixture.

SIEGFRIED SKRAUP.